(12) United States Patent
Futselaar et al.

(10) Patent No.: US 10,266,439 B2
(45) Date of Patent: Apr. 23, 2019

(54) METHOD FOR CLEANING MEMBRANES AND AN INLET SIDE OF A MEMBRANE FILTRATION MODULE OF AN APPARATUS HAVING A BIOREACTOR AND MEMBRANE FILTRATION MODULE FOR TREATMENT OF AN INCOMING FLUID

(71) Applicant: X-Flow B.V., Enschede (NL)

(72) Inventors: Harry Futselaar, Hengelo (NL); Rob Borgerink, Albergen (NL)

(73) Assignee: X-Flow B.V., Enschede (NL)

(*) Notice: Subject to any disclaimer, the term of this patent is extended or adjusted under 35 U.S.C. 154(b) by 529 days.

(21) Appl. No.: 14/198,700

(22) Filed: Mar. 6, 2014

(65) Prior Publication Data

US 2014/0311975 A1  Oct. 23, 2014

Related U.S. Application Data

(62) Division of application No. 12/301,660, filed as application No. PCT/NL2007/000136 on May 29, 2007, now abandoned.

(30) Foreign Application Priority Data

May 31, 2006  (NL) ..................... 1031926

(51) Int. Cl.
*C02F 1/42* (2006.01)
*C02F 3/12* (2006.01)
(Continued)

(52) U.S. Cl.
CPC .......... *C02F 3/1273* (2013.01); *C02F 3/1268* (2013.01); *Y02W 10/15* (2015.05)

(58) Field of Classification Search
CPC ........ B01D 15/00; B01D 63/00; B01D 63/01; B01D 63/06; B01D 63/16; B01D 65/02; B01D 65/06; B01D 65/08; B01J 39/02
(Continued)

(56) References Cited

U.S. PATENT DOCUMENTS 3,567,030 A * 3/1971 Loeffler ................. B01D 61/08
  210/321.68
4,039,452 A * 8/1977 Fernandez ............. B01D 29/05
  210/106

(Continued)

FOREIGN PATENT DOCUMENTS

CA  2547061 A1  6/2005
CA  2579857 A1  3/2006
(Continued)

OTHER PUBLICATIONS

English translation for communication from a foreign patent office for a counterpart foreign application dated Oct. 29, 2013.
(Continued)

*Primary Examiner* — Hayden Brewster
(74) *Attorney, Agent, or Firm* — Quarles & Brady LLP

(57) ABSTRACT

A method for cleaning membranes and an inlet side of a membrane filtration module of an apparatus includes filling a basin with a treatment fluid; feeding an incoming fluid to the treatment fluid present in the basin and mixing and treating it with the latter fluid so as to obtain a fluid mixture; feeding the fluid mixture to the membrane filtration module; discharging permeate filtered by and retentate retained by the membranes; and periodically closing the fluid mixture feed-through line and opening the flushing discharge line, so that at least the inlet side of the membranes and the connection chamber of the membrane filtration module disposed underneath it are flushed.

19 Claims, 10 Drawing Sheets

(51) Int. Cl.
  *B01D 15/00* (2006.01)
  *B01D 63/00* (2006.01)
  *C02F 11/00* (2006.01)
  *C02F 9/00* (2006.01)

(58) Field of Classification Search
  USPC ...... 210/106, 195.2, 195.3, 209, 220, 221.2,
    210/257.2, 258, 261, 321.6, 321.64,
    210/321.69, 321.79, 321.8, 321.88,
    210/321.89, 323.2, 330, 333.01, 333.1,
    210/500.23, 605, 620, 626, 631, 636, 650,
    210/651, 652, 682, 758, 760, 791, 797
  See application file for complete search history.

(56) References Cited

U.S. PATENT DOCUMENTS

| | | | |
|---|---|---|---|
| 5,494,577 A | 2/1996 | Rekers | |
| 5,607,593 A * | 3/1997 | Cote | B01D 61/147 |
| | | | 210/195.2 |
| 6,113,791 A | 9/2000 | Hartmann | |
| 2005/0184008 A1* | 8/2005 | Schacht | B01D 65/00 |
| | | | 210/636 |
| 2005/0194310 A1 | 9/2005 | Yamamoto et al. | |
| 2006/0081534 A1 | 4/2006 | Dimitriou et al. | |
| 2006/0213833 A1* | 9/2006 | Kando | B01D 65/02 |
| | | | 210/626 |
| 2008/0135497 A1* | 6/2008 | Fuchs | B01D 61/18 |
| | | | 210/767 |
| 2010/0072130 A1* | 3/2010 | Fane | B01D 61/364 |
| | | | 210/605 |

FOREIGN PATENT DOCUMENTS

| | | |
|---|---|---|
| DE | 29620426 U1 | 11/1996 |
| EP | 0510328 A2 | 10/1992 |
| EP | 1647530 A1 | 4/2006 |
| EP | 1704911 A1 | 9/2006 |
| JP | H6-7650 A | 1/1994 |
| JP | H8-206656 A | 8/1996 |
| JP | 2001-205055 A | 7/2001 |
| JP | 2001-232160 A | 8/2001 |
| JP | 2003-53154 A | 2/2003 |
| JP | 2003-144863 A | 5/2003 |
| JP | 2004-57883 A | 2/2004 |
| JP | 2004-249235 A | 9/2004 |
| JP | 2006-55852 A | 2/2006 |
| JP | 2006-122801 A | 5/2006 |
| RU | 2092235 C1 | 10/1997 |
| RU | 58117 U1 | 11/2006 |
| RU | 2314864 C2 | 1/2008 |
| WO | 94/29007 A1 | 12/1994 |
| WO | 03/095077 A1 | 11/2003 |

OTHER PUBLICATIONS

English translation of a Japanese Office Action dated Jul. 10, 2012.
Written Opinion of the International Searching Authority.
International Preliminary Report on Patentability.
NL 1031926 Search Report.
English translation of RU 2092235 C1.
English translation of DE 29620426.
English translation of JP 2001-205055.
English translation of JP 2001-232160.
English translation of JP 2003-53154.
English translation of JP 2003-144863.
English translation of JP 2004-57883.
English translation of JP 2004-249235.
English translation of JP H6-7650.
English translation of JP 2008-122801.
English translation of JP 2006-55852.
English translation of JP H8-206656.
English translation of WO 03/095077.
English translation of RU 2314864 C2.
English translation of WO 94/29007 A1.
English translation of RU 58117U1.
Canadian Office Action dated Jan. 20, 2017 for a counterpart foreign application.

* cited by examiner

METHOD FOR CLEANING MEMBRANES AND AN INLET SIDE OF A MEMBRANE FILTRATION MODULE OF AN APPARATUS HAVING A BIOREACTOR AND MEMBRANE FILTRATION MODULE FOR TREATMENT OF AN INCOMING FLUID

CROSS-REFERENCE TO RELATED APPLICATIONS

This application is a Divisional of U.S. application Ser. No. 12/301,660, filed Dec. 12, 2008, which is the U.S. National Stage of International Application No. PCT/NL2007/000136, filed May 29, 2007, which claims the benefit of Netherlands Application No. NL 1031926, filed May 31, 2006, the contents of all of which are incorporated by reference herein.

FIELD OF THE INVENTION

The invention relates to a method for cleaning membranes and an inlet side of a membrane filtration module of an apparatus for treatment of an incoming fluid, comprising a bioreactor and a membrane filtration module, also referred to as membrane bioreactor (MBR).

BACKGROUND OF THE INVENTION

A membrane bioreactor is known, for example, for purifying waste water, and comprises a basin which is partially filled with active sludge. During operation, the waste water is fed to the basin where it mixes with the sludge. The active ingredients in the sludge take care of purifying the waste water. This process is accelerated even more by supplying a gas, usually air, from below to (part of) the basin. The mixture of sludge and waste water is then fed to the membrane filtration module where purified water is discharged as permeate, while the retained liquid, polluted particles and sludge particles as retentate are fed back to the basin. The membrane bioreactor is able to work with a high concentration of sludge particles, especially compared to a conventional system in which the bioreactor is combined with a settling tank. As a result, the discharged purified water can be of high quality, and it is even readily possible to use the membrane bioreactor for treating heavily polluted sewage water and/or streams of industrial waste water.

The known membrane bioreactors can be divided into two groups, i.e.: a dry-pit system or a submerged system. With the dry-pit system, a membrane filtration module is placed outside the basin of the bioreactor. With the submerged system, membranes are suspended inside the basin of the bioreactor. In recent years, both systems have developed in such a way that they show an increasing number of similarities. Thus, for example, the membranes of the submerged system are more and more often accommodated in a housing provided with inlet and outlet apertures, which housing is then suspended in the basin like a box. In addition, there is a development taking place where more and more facilities are being placed around these boxes which are intended to supervise the flow past these membranes in order to optimize the performance of these membranes. This has resulted in a membrane filtration module for the purpose of the submerged system which is or will be increasingly similar to a membrane filtration module in the dry-pit system.

An example of a submerged system with flat membrane panels in a treatment tank is disclosed in EP 0 510 328. An example of a dry-pit system with tubular membranes which are accommodated in a membrane filtration module is disclosed in U.S. Pat. No. 5,494,577.

For both systems, it is disadvantageous that the membrane surfaces can become soiled quickly and that the flow passages inside the membranes and/or between and/or around the membranes often become blocked with foreign particles in the liquid stream during operation. This soiling and/or these blockages are caused by all kinds of particles which are entrained with the waste water, such as hairs, threads, etc. The soiling and/or the blockages may also be caused by biologically, physically or otherwise deformed particles which result from the reactions between the sludge and the waste water. Another possibility is that soiling may precipitate or blow or otherwise end up in the basins which are usually open to the elements. The direct consequence of the soiling and/or the blockage of the flow passages is the loss of effective membrane surface. In addition, it results in the distribution of the liquid stream across the flow passages no longer being homogeneous. This non-homogeneous distribution leads to large variations in the liquid velocity and the turbulence thereof along the flow passages, as a result of which a crust of particles may form along the membrane surfaces. This in turn leads to a greater risk of blockage of (a part of) the flow passages, as a result of which the liquid distribution may become disturbed even further. As a result, an increasing amount of effective membrane surface is lost and an increasing amount of energy has to be supplied in order to maintain the through-flow through the flow passages which are increasingly difficult to flow through.

In order to prevent the flow passages from becoming soiled and/or blocked, it is known to use a filter upstream of the membrane filtration module in order thereby to catch particles. However, it has been found that thread-like particles are still able to slip through the filter, and then still cause the abovementioned problems. Furthermore, it has been found that the encrusted particles in the membrane filtration module are very difficult to remove, and that they can damage the membrane material. If soiling is observed with the known systems, then the soiled membrane filtration module is disconnected, connected to a cleaning unit and cleaned manually or semi-automatically. In this case, it is common practice for the blocked flow passages to be flushed back regularly with a cleaning liquid. This procedure usually takes up 10 to 20% of the operating time of a membrane filtration module. The possibility and the frequency thereof is dependent on the type of membrane filtration module and is usually in the order of magnitude of one to 60 minutes. In addition, the membrane filtration module can also be cleaned using a chemical cleaning liquid. This entire process takes as much as half an hour to a few hours per membrane filtration module and is again carried out at a frequency of once a day to once a week, or once a month to once a year, depending on the membrane filtration module and operation. If desired, the membrane filtration module can be opened, the blocked membranes can be removed therefrom and the soiling can then be removed using brushes, jets of water or any other mechanical ancillary means. This cleaning method takes even more process time and is generally very labour-intensive and is only carried out in cases of extreme soiling and/or blockage. If, in addition, a filter having openings smaller than 5 mm, or more commonly smaller than 3 mm and preferably smaller than 1 mm is used upstream of the membrane filtration module, then this filter has to be cleaned very regularly. An apparatus for treatment of a fluid is known from DE 2196 20 246.

SUMMARY OF THE INVENTION

It is an object of the present invention to at least partially overcome the abovementioned drawbacks and/or to provide a usable alternative. In particular, it is an object of the invention to provide an efficient method for cleaning membranes and an inlet side of a membrane filtration module of a membrane bioreactor such that it is less affected by soiling and/or blockage.

This object is achieved by a method according to the present invention. The apparatus in this case comprises a bioreactor having a dry-pit or submerged membrane filtration module, which module is provided on the inlet side, where a connection chamber is left clear, with a discharge line which discharges outside the fluid space. The discharge line is provided with a controllable closing element. A fluid mixture feed-through line from the fluid space of the basin to the connection chamber is also provided with a controllable closing element. In addition, a control unit is provided for closing the fluid mixture feed-through line and opening the discharge line at the desired moment, and vice versa. As a result thereof, it is advantageously possible to automatically flush at least the inlet side of the membrane and the connection chamber beneath it. During flushing, soiled and encrusted particles are released from the inlet side and/or from the surfaces of the membranes and are discharged outside the fluid space via the open discharge line. When flushing has finished, for example after a preset period of time has lapsed, the treatment process can be resumed immediately, by again closing the discharge line and opening the fluid mixture feed-through line.

It has been found in practice that the flushing step advantageously, if repeated regularly, after a certain period of normal operation of the apparatus, ensures that the pressure on the inlet side of the membrane filtration module can remain stable for a long period of time. This is connected with the fact that the flushing step ensures that the soiling and/or blockages of the flow passages of the membranes is/are cleaned away in an efficient manner. Furthermore, it has been found that the flushing step leaves the membrane surface, the flow passages, as well as the inlet side of the flow passages intact.

The succession of a period of fluid treatment and a period of flushing is referred to in this case as a filtration cycle. After a number of such filtration cycles, it is possible to use other cleaning methods in order to further improve the membrane performance. Consideration may be given to flushing the module with supplied pressurized air, the use of chemical cleaning agents, and/or disassembling the membrane filtration module in order to be able to clean the parts separately.

In accordance with a particular embodiment, the control unit is equipped with a counter for periodically initiating the flushing step. The counter may in this case be set to a value of between 0.1-1000 hours, in particular between 0.2-1000 hours, or more in particular between 1-24 hours. When the counter reaches the preset value, the control unit ensures that the fluid mixture feed-through line is closed and the discharge line opened.

In another embodiment, the control unit is designed in order to start the flushing process in dependence on measurement values relating to the performance of the membrane filtration module. This may, for example, be measuring pressure at certain positions within the membrane filtration module or recording the amount of energy which is required in order to pass the fluid through the flow passages of the membranes. A combination of initiating mechanisms is likewise possible.

The time which is required for the flushing step can be made dependent on the observed soiling and/or blockages in the flow passages, but may also be set to a fixed value.

In one particular embodiment, the closable fluid mixture feed-through line is formed by the fluid inlet line which discharges into the connection chamber of the membrane filtration module. To this end, the fluid inlet line is provided with a controllable closing element. This embodiment is in particular advantageous in combination with a dry-pit membrane filtration module. In a variant thereof, the membrane filtration module is submerged in the fluid space of a sub-basin. In this case, the connection chamber of the membrane filtration module is then provided with one or more inflow openings. The closable fluid mixture feed-through line can in this case be formed by a flow connection between the fluid space of the basin and the fluid space of the sub-basin. This flow connection may then be provided with a controllable closing element.

In a preferred embodiment, it is possible to provide a controllable flushing liquid feed line on the permeate side and/or retentate side and/or on the connection chamber of the membrane filtration module. This flushing liquid can then ensure that a more thorough flushing and discharging of the soiling and/or blockages to beyond the fluid space takes place during the flushing step. Depending on the observed soiling or blockage, the flushing liquid can be supplied at a significantly higher pressure than the fluid pressure in the module during treatment. In particular, the flushing liquid pressure may be more than 1-20 times higher than the fluid pressure during operation, more particularly more than 3-10 times higher.

In a variant or in addition to supplying flushing liquid, the fluid which is already present within the membrane filtration module can advantageously also be used. For example, if the flow passages of the membranes have a length of 1-6 meters and these flow passages are arranged in the vertical direction above the connection chamber, there is more than sufficient fluid pressure in these flow passages as a result of the force of gravity. This fluid pressure ensures that the flow passages and the connection chamber are automatically flushed with the fluid which is inside the flow passages as soon as the fluid mixture feed-through line is closed and the discharge line is opened.

The slurry which has been discharged via the discharge line to beyond the fluid space can be collected in an external settling tank and subsequently be fed back to the basin of the bioreactor, optionally after further purification by means of a filter. Thus, it is advantageously possible to maintain the concentration of treatment fluid in the bioreactor at the desired level. This may in practice also advantageously ensure a periodical cleaning of the treatment fluid in such a manner that periodical cleaning or changing of the entire amount of treatment fluid in the basin is no longer required. This significantly reduces the down time of the apparatus. It is also possible to discharge (part of) the slurry to the outside. However, in that case treatment fluid will have to be supplied to the basin regularly as a compensating measure.

In a preferred embodiment, gas distribution means are provided which discharge into the connection chamber of the membrane filtration module. During the fluid treatment, these gas distribution means supply gas bubbles which also ensure that the fluid is conveyed through the flow passages of the module. Advantageously, it is also possible to clean the gas distribution means during the flushing step, for example by temporarily increasing the gas supply pressure. Thus, it is prevented that the gas distribution means require an increasingly high pressure in order to be able to supply gas during the fluid treatment. Other possibilities of cleaning these gas distribution means are flushing with a fluid, for example permeate or a liquid to which cleaning chemicals have been added.

Further preferred embodiments of the invention are described hereinafter.

BRIEF DESCRIPTION OF THE DRAWINGS

The invention will be explained in more detail with reference to the attached drawings, in which.

DETAILED DESCRIPTION OF PREFERRED EMBODIMENTS

Figure 1:
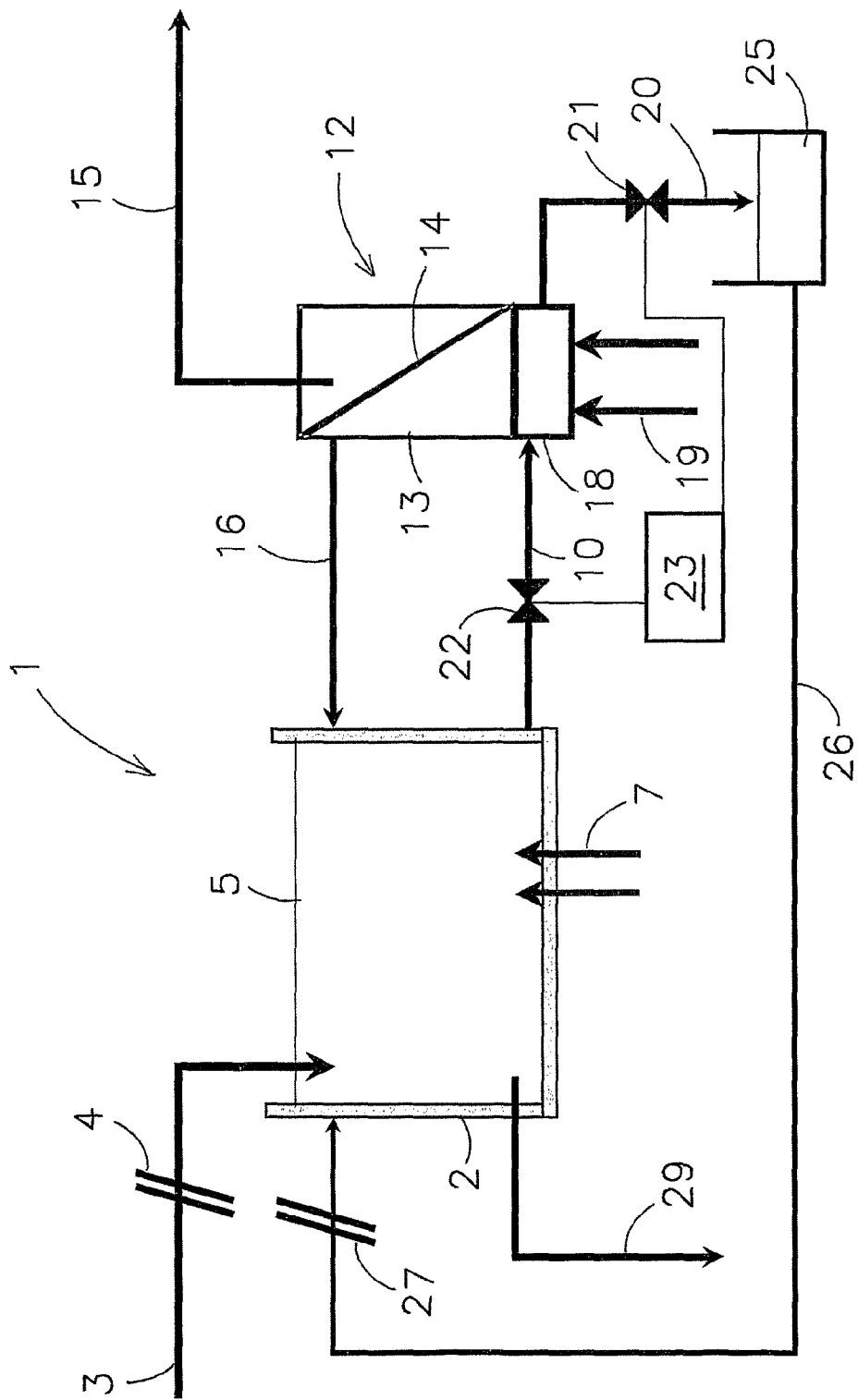
FIG. 1 shows a diagrammatic view of an embodiment of the apparatus according to the invention with a dry-pit membrane filtration module.

In FIG. 1, the apparatus for treatment of a fluid is denoted overall by reference numeral 1. The apparatus 1 comprises a bioreactor with a basin 2 with a fluid space which contains a biomass, in particular active sludge. A fluid feed line 3 opens into the basin 2 via which fluid feed line 3 raw waste water is passed to the basin 2. In the fluid feed line 3, there is a filter 4 by means of which a first purification of the waste water is carried out. This may be a filter with one specific mesh width or a range of different mesh widths. In the basin 2, the waste water mixes with the active sludge, as a result of which a fluid mixture 5 is formed. First gas distribution means 7 discharge into the bottom of the basin 2 via which gas distribution means 7 gas is added to (part of) the fluid mixture 5. In the fluid mixture 5, the waste water is cleaned further by means of, inter alia, aerobic reactions with the active sludge particles. Depending on the geometry of basin 2, the location of the gas distribution means 7, and the flow patterns in basin 2, different reaction zones may result. The fluid mixture 5 is supplied to a membrane filtration module 12 via a fluid inlet line 10. It is possible to incorporate another filter in this feed line as well in order to recover soiling components which have not been recovered before and/or which were formed during the reactions. The membrane filtration module 12 comprises a housing 13 in which there is a membrane surface 14. On the permeate side of the membrane 14, a permeate discharge line 15 is provided. On the retentate side of the membrane 14, a retentate discharge line 16 is provided. The retentate discharge line 16 opens into the basin 2. On the inlet side of the module 12, that is to say where the fluid inlet line 10 joins the housing 13, there is a connection chamber 18. Second gas distribution means 19 discharge into the bottom of the connection chamber 18. These ensure that the membrane surface 14 is kept clean by means of treatment with gas during fluid treatment, and ensure that the fluid mixture is conveyed along and through the membrane surface 14.

According to the invention, the connection chamber 18 is provided with a discharge line 20. The discharge line 20 is provided with a controllable shut-off valve 21. The fluid inlet line 10 is likewise provided with a controllable shut-off valve 22. A control unit 23 is provided for controlling the shut-off valves 21 and 22. Following a period of fluid treatment in which clean water is discharged via the permeate discharge line 15, and in which retained fluid is fed back to the basin 2 via the retentate discharge line 16, according to the invention a flushing step takes place in each case by means of a suitable actuation of the shut-off valves 21 and 22 via the control unit 23. In this case, the shut-off valve 22 of the fluid inlet line 10 is closed and the shut-off valve 21 of the discharge line 20 is opened. The fluid which is inside the membrane filtration module 12 (on the retentate side) is then free to flow away in a downwards direction in one go via the connection chamber 18 towards the open discharge line 20. This sudden downwards flow ensures in a very efficient way that the soiling components inside the membrane filtration module 12, both along the membrane surface and in the connection chamber 18, are discharged outside the module 12. As soon as this flushing process has finished, the control unit 23 makes sure that the shut-off valve 21 of the discharge line 20 is closed again, and the shut-off valve 22 of the fluid inlet line 10 is reopened. Then, another fluid treatment can be carried out, following which another flushing step can be carried out, etc.

The discharge line 20 ends above a settling container 25. The contents of this settling container 25 can be discharged to an external receptacle at set times. It is also possible to feed the contents of the settling container 25, or part thereof, back to the basin 2 via a sediment discharge line 26. The sediment discharge line 26 may optionally be provided with a filter 27.

The basin 2 is also provided with a drain discharge line 29 via which, usually in a discontinuous manner, sludge can be drained.

Figure 2:
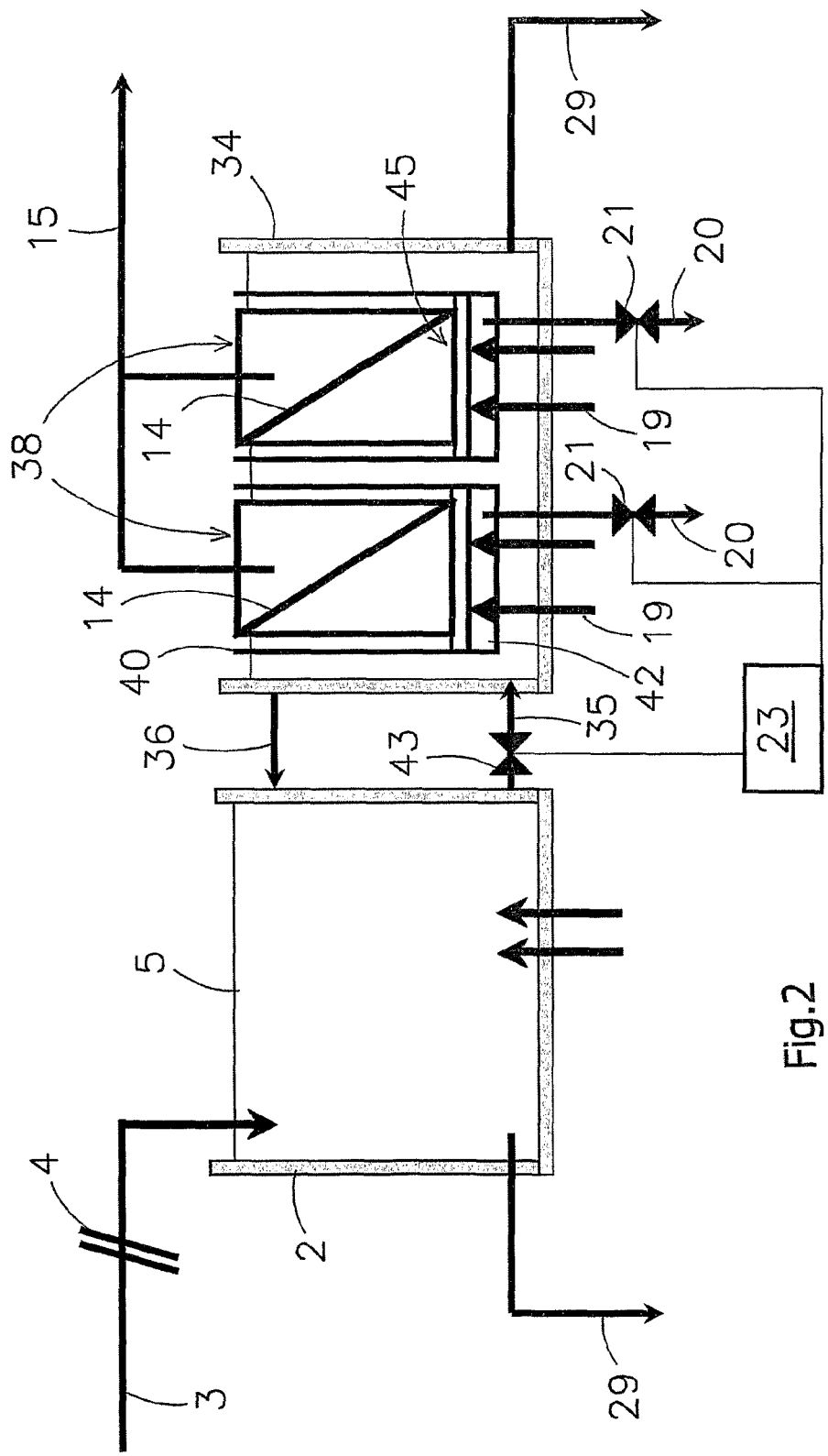
FIG. 2 shows a view corresponding to that of FIG. 1 with submerged membrane filtration modules.

FIG. 2 shows a variant with two submerged membrane filtration modules. Identical components are in this case denoted by the same reference numerals as in FIG. 1. The apparatus comprises a separate sub-basin 34 with a fluid space which is in flow connection with the fluid space in the basin 2 via supply and discharge lines 35, 36. Two membrane filtration modules 38 are submerged in the fluid space of the sub-basin 34. Each membrane filtration module 38 comprises a surrounding housing 40 containing the membrane surface 14. At the bottom side, the housing 40 delimits a connection chamber 42 which is in turn provided with a closable discharge line 20 which discharges outside the fluid space of the sub-basin 34. The location of the fluid inlet line cannot be specified as clearly as is the case with a dry-pit embodiment, and forms part of one or more inflow openings in the connection chamber 42 in which the fluid mixture from the sub-basin 34 mixes with gas which has been introduced by the gas distribution means 19, which mixture then passes along and through the membrane surface 14. The exact design of the fluid inlet line depends on the embodiment of the submerged membrane filtration module 38.

The feed line 35 is provided with a controllable shut-off valve 43. Following a period of fluid treatment, a flushing step can then be carried out by means of a suitable actuation of the shut-off valves 21 and 43 via the control unit 23. In this case, the shut-off valve 43 of the feed line 35 is closed and the shut-off valves 21 of the discharge lines 20 are opened. The fluid which is in the sub-basin 34 and inside the membrane filtration modules 38 is then free to flow away in a downwards direction in one go to the open discharge lines 20 via the connection chambers 42. The fluid mixture level in the sub-basin 34 will in this case fall to the level of the connection chambers 42, as the discharge lines 20 start at the connection chambers 42. If desired, the discharge lines may also start at a lower level and/or be provided with inflow openings at a lower level, so that the sub-basin 34 can empty further or even completely. As soon as the flushing process has finished, the control unit 23 again ensures that the shut-off valves 21 are closed, and the shut-off valve 43 is opened.

FIG. 2 furthermore shows that an additional prefilter 45 is provided at the top of the connection chamber 42, in order to protect the inflow side of the membranes which are inside the membrane filtration module against blockage. This additional prefilter 45 will also be flushed clean in an efficient manner during each flushing step, after which the resulting slurry is discharged via the discharge line 20. The prefilter 45 can supplement or even take over the function of any filter in the feed line 35.

Figure 3:
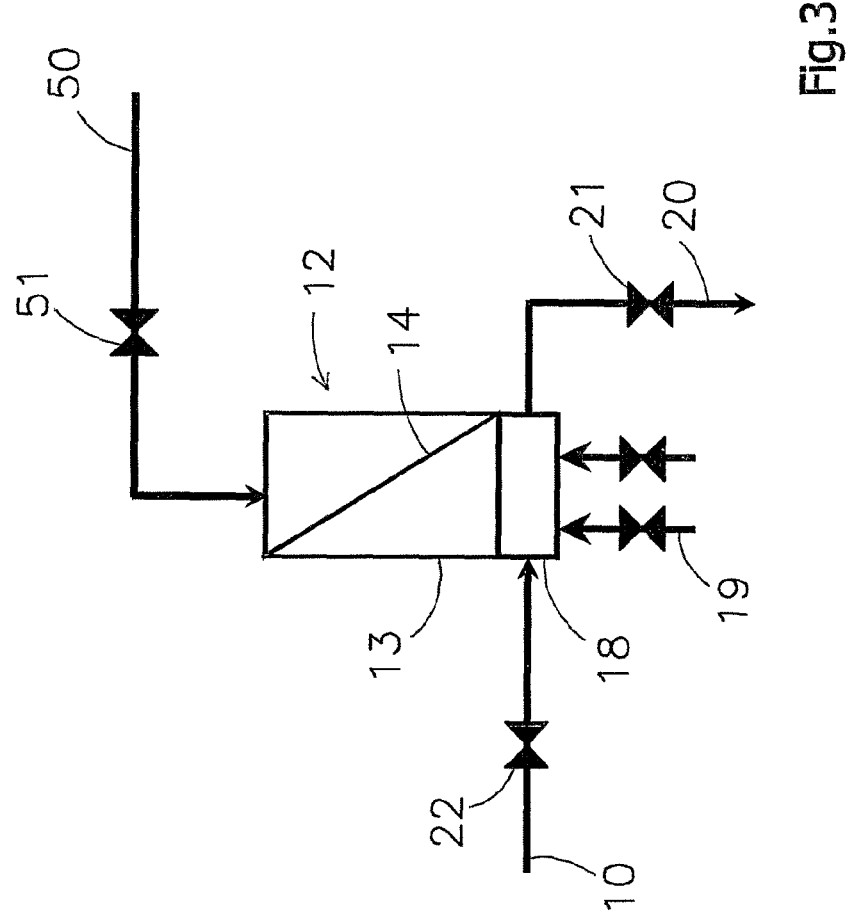
FIG. 3 shows a part view of FIG. 1 of a first variant embodiment of the membrane filtration module.
Figure 4:
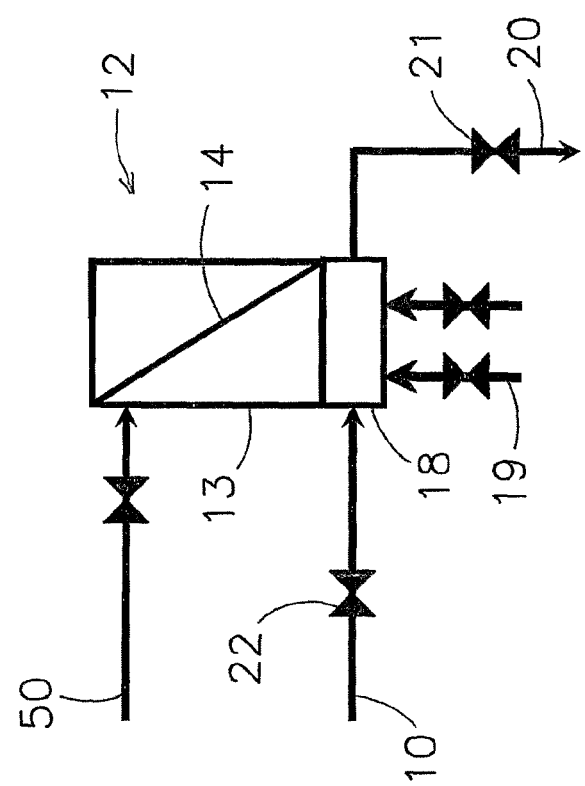
FIG. 4 shows a view corresponding to that of FIG. 3 of a second variant embodiment.
Figure 5:
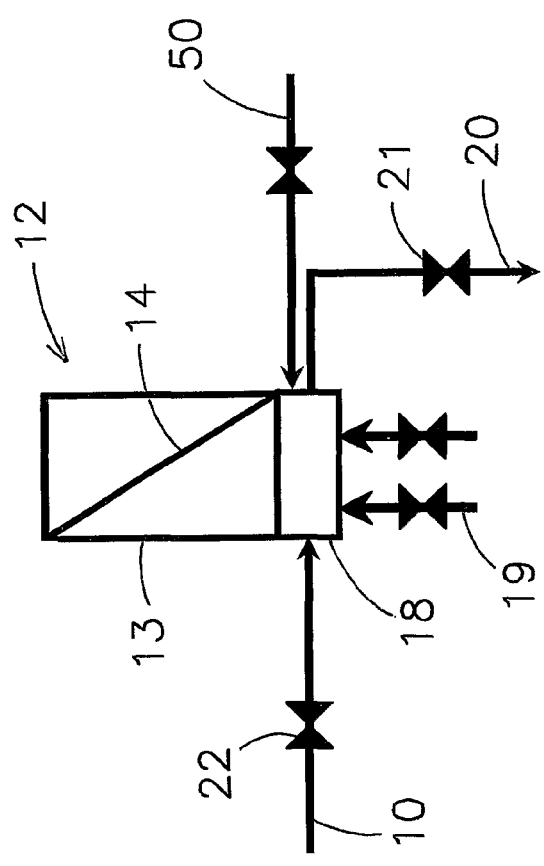
FIG. 5 shows a view corresponding to that of FIG. 3 of a third variant embodiment.

For the flushing step, the embodiments of FIGS. 1 and 2 use the fluid which is in the membrane filtration modules. With the variant shown in FIG. 3, a controllable flushing liquid feed line 50 is provided in addition thereto and is connected to the permeate side of the module 12. During the flushing step, the shut-off valve 51 of the flushing liquid feed line 50 is temporarily opened by the control unit. As a result thereof, the space inside the module 12, including the membrane surfaces 14 and the connection chamber 18 are cleaned further by flushing. FIG. 4 shows a variant in which the closable flushing liquid feed line 50 is connected to the retentate side of the module 12. FIG. 5 shows a variant in which the closable flushing liquid feed line 50 is connected to the connection chamber 18 of the module 12. With these variants as well, a further improvement of the flushing step can be achieved. It is also possible to provide a combination of the flushing liquid feed lines shown in FIGS. 3-5, so that, depending on the soiling and/or blockage observed, one or more of these flushing liquid feed lines can be opened.

Figure 6:
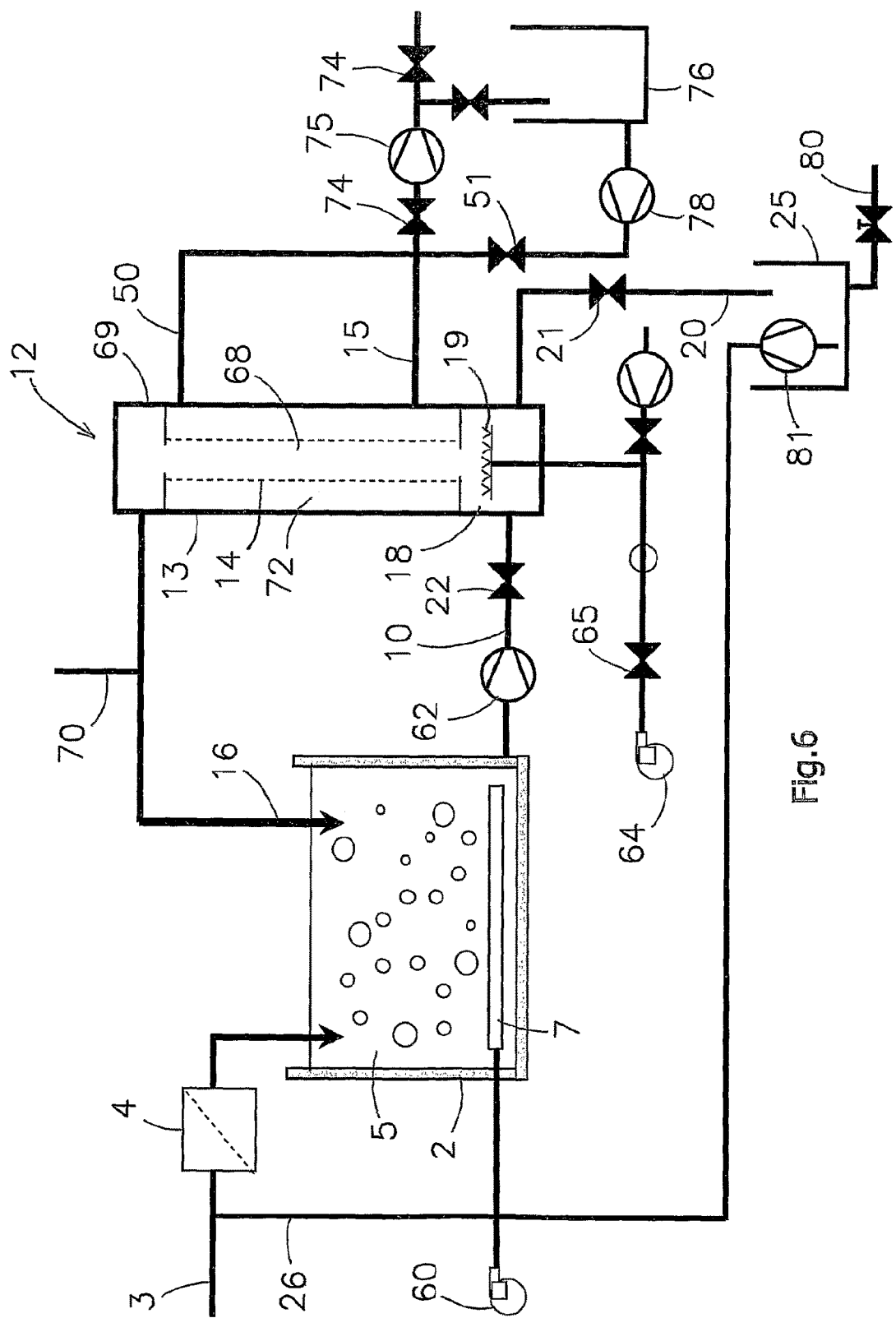
FIG. 6 shows a diagrammatic view in more detail of a variant embodiment of FIG. 1.

FIG. 6 shows a variant of FIG. 1 in which identical components are denoted by the same reference numerals. Only the differences will be briefly discussed below. The first gas distribution means are in this case formed by a distribution panel provided with a plurality of outflow openings which extends over the bottom of the basin 2 and is connected to a ventilator 60. In order to be able to pass the fluid mixture through the membrane filtration module 12 with greater force, a pump 62 is provided in the closable fluid inlet line 10. The second gas distribution means 19 in the connection chamber 18 are supplied with a gas via a ventilator 64. A controllable shut-off valve 65 is provided between the ventilator 64 and the second gas distribution means 19. The module 12 is provided with two membrane panels 14 between which a flow passage 68 is left clear which forms the retentate side. At its top, this flow passage 68 opens out into a chamber 69 which is connected to the fluid space in the basin 2 via the retentate discharge line 16. The retentate discharge line 16 is furthermore provided with a branch 70 for discharging retentate to another location, if desired.

On the outside of the membrane panels 14 is the permeate side 72 to which the permeate discharge line 15 is connected. The permeate discharge line 15 is provided with a controllable shut-off valve 74, via which the permeate discharge line 15 can be closed during the flushing step, if desired. Furthermore, the permeate discharge line 15 comprises a pump 75 for pressurized discharge of the cleaned fluid. The cleaned fluid can then be discharged to a receptacle 76 and/or to an external location (not shown in any more detail). From the receptacle 76, the treated fluid can be supplied as flushing liquid to the module 12 via the flushing liquid feed line 50 during the flushing step. In order to be able to supply the flushing liquid at sufficient pressure, a pump 78 is provided.

The settling container 25 is provided with a closable sediment discharge line 80. Furthermore, the sediment discharge line 26 leading back to the basin is provided with a pump 81, and the sediment discharge line 26 now discharges into the filter 4 provided in the fluid feed line 3. Thus, a highly multifunctional treatment apparatus is achieved, in which use is made of treated fluid and discharged retentate or slurry, respectively, in an efficient way.

Figure 7:
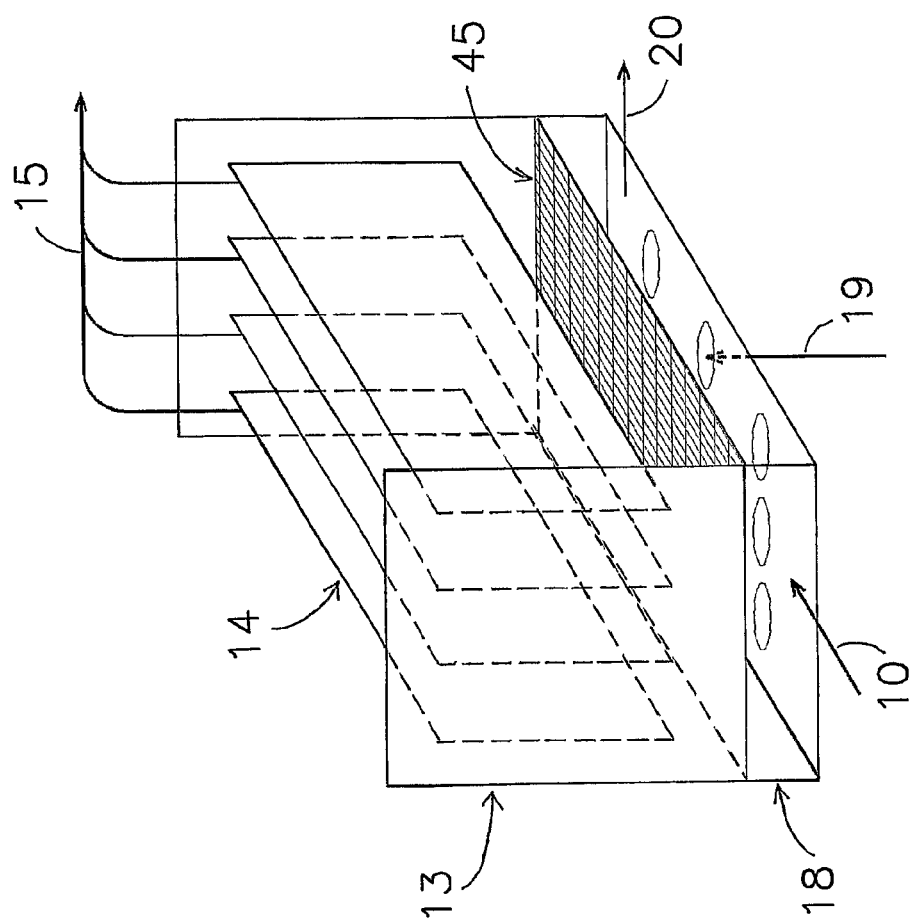
FIG. 7 shows a diagrammatic view of a membrane filtration module with plate-shaped membranes.

FIG. 7 shows a variant of a membrane filtration module, in which identical components are again denoted by the same reference numerals as in the preceding figures. It can clearly be seen that the membranes 14 in this case are of the flat plate-shaped type. The prefilter 45 which is provided at the top of the connection chamber 18 can also clearly be seen.

Figure 8:
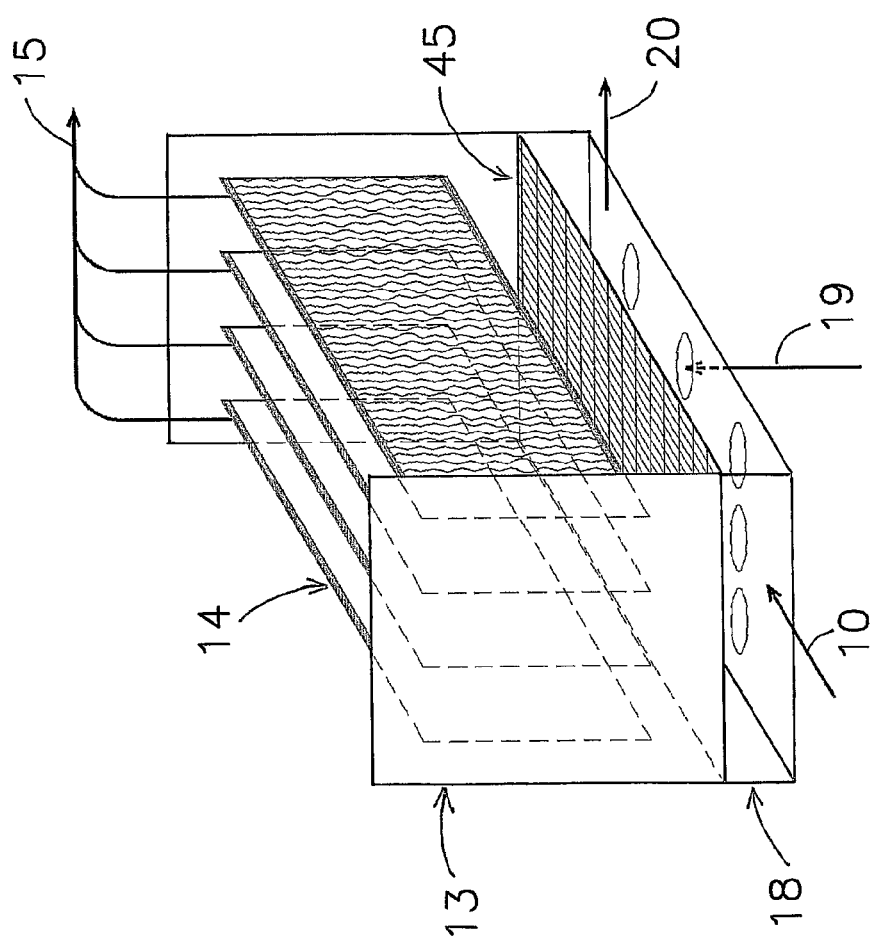
FIG. 8 shows a view corresponding to that of FIG. 7 with tubular membranes placed in a row.

FIG. 8 shows a variant of FIG. 7 in which the membranes 14 comprise a plurality of hollow fibres or capillaries placed in rows next to one another.

Figure 9:
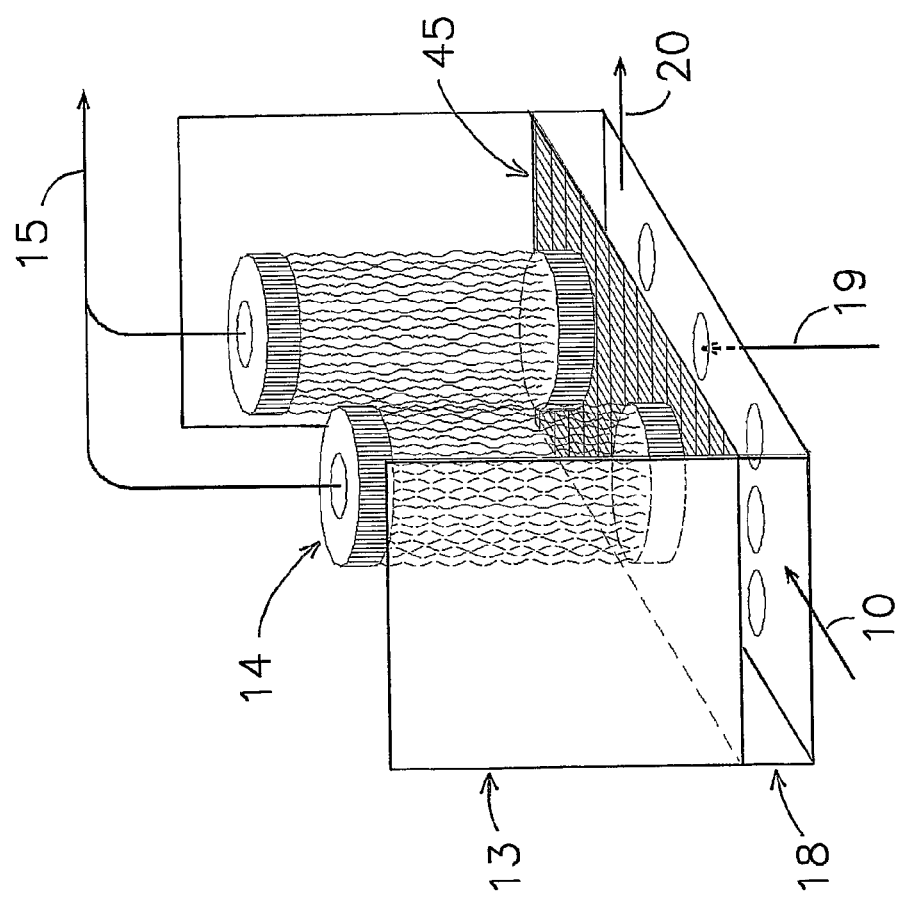
FIG. 9 shows a view corresponding to that of FIG. 7 with bundled tubular membranes.

FIG. 9 shows a variant of FIG. 7 in which the membranes 14 comprise a plurality of hollow fibres or capillaries arranged in bundled form.

Figure 10:
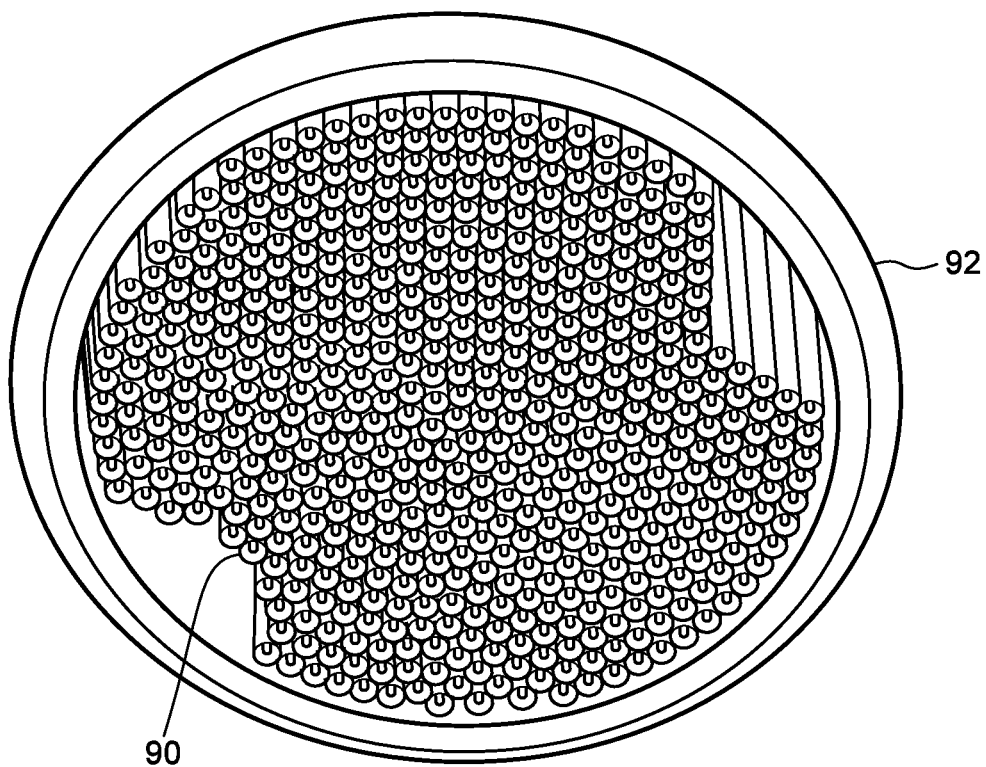
FIG. 10 shows a greatly magnified bottom view of an exploded membrane filtration module with several bundled tubular membranes.

If several hollow fibres or capillaries or tubelets placed next to one another are used as membranes, in particular in a bundled form, then these can together advantageously form a prefilter. This can render the function of the prefilter 45 provided in FIG. 9 and/or the possible filter in the fluid inlet line mentioned before obsolete or significantly facilitate the task thereof. Thus, for example, a larger mesh width may then be selected for the prefilter 45. FIG. 10 shows the way the plurality of hollow fibres or capillaries or tubelets 90 work as a prefilter 92.

Many variants are possible in addition to the embodiments illustrated. Thus, the membranes and/or the membrane filtration modules can be arranged both horizontally and vertically or in other positions. With the submerged variant, it is also possible to place the membrane filtration modules directly in the basin. If desired, a dividing wall can be placed in the basin between the section where the membrane filtration module is disposed and the section where the incoming fluid flows in.

Furthermore, the invention can be used with all types of membranes, independent of their shape (for example, but not exclusively, flat or of any possible diameter), filtration side (inner side or outer side) or material (for example polymer or ceramic).

In addition, the invention can be used with any membrane process of which a membrane bioreactor forms part. Currently, the most common processes are those which are referred to as microfiltration or ultrafiltration, but other membrane processes, such as nanofiltration and reverse osmosis/hyperfiltration, are also possible.

Thus, according to the invention, a membrane bioreactor with a significantly improved action has been provided due to the feature of periodically flushing the membrane filtration modules and, if desired in combination with the former, the gas distribution means with discharge line to outside the fluid space. The flushing step is advantageously combined with the integrated cleaning of the treatment fluid and the periodic draining thereof, respectively.

The invention claimed is:

1. A method for cleaning membranes and an inlet side of a membrane filtration module of an apparatus, which comprises the following steps:
providing an apparatus for treatment of an incoming fluid, which apparatus comprises:
a bioreactor with a basin with a fluid space that is meant to be at least partially filled with a treatment fluid;
a fluid feed line designed to discharge the incoming fluid into the basin for feeding, during operation; and
a dry-pit membrane filtration module comprising a housing with one or more incorporated membranes, an inlet side, a permeate side and a retentate side,
wherein the housing delimits a connection chamber on the inlet side, upstream of the membranes into which connection chamber a fluid inlet line discharges which is connected to the fluid space of the basin, and wherein the housing further comprises a permeate discharge line connected to the permeate side and a retentate discharge line connected to the retentate side,
wherein a closable flushing discharge line is provided which is connected on one side to the connection chamber and on the other side discharges outside the fluid space,
wherein a fluid mixture feed-through line from the basin to the connection chamber is closable and is formed by the fluid inlet line, which discharges into the connection chamber to which the closable flushing discharge line is also connected;
filling the basin with the treatment fluid;
feeding the incoming fluid to the treatment fluid present in the basin, the incoming fluid being mixed and treated with the treatment fluid so as to obtain a fluid mixture;
feeding the fluid mixture to the membrane filtration module;
discharging permeate filtered by and retentate retained by the one or more incorporated membranes; and
periodically closing the fluid mixture feed-through line and opening the flushing discharge line with a control unit, so that at least the inlet side of the one or more incorporated membranes and the connection chamber disposed underneath are flushed as a result of a fluid pressure within the housing and the force of gravity and the fluid mixture discharges through the flushing discharge line in the absence of a pump in the flushing discharge line.

2. The method according to claim 1, wherein the periodic closing of the fluid mixture feed-through line and opening of the flushing discharge line is initiated by a counter, a time period, a local pressure and/or a calculated transmembrane pressure differential.

3. The method according to claim 1, wherein during the periodic closing of the fluid mixture feed-through line and opening of the flushing discharge line a flushing liquid is delivered to the permeate side of the membrane filtration module.

4. The method according to claim 1, wherein during the periodic closing of the fluid mixture feed-through line and opening of the flushing discharge line a gas is delivered to a gas distributor which discharges into the connection chamber of the membrane filtration module.

5. The method according to claim 1, wherein during the periodic closing of the fluid mixture feed-through line and opening of the flushing discharge line a flushing liquid is delivered to the retentate side of the membrane filtration module.

6. The method according to claim 1, wherein during the periodic closing of the fluid mixture feed-through line and opening of the flushing discharge line a flushing liquid is delivered to the inlet side of the membrane filtration module.

7. The method according to claim 1, wherein the step of feeding an incoming fluid to the treatment fluid present in the basin and mixing the incoming fluid and the treatment fluid to obtain a fluid mixture takes place in a continuous process.

8. The method according to claim 1, wherein the incoming fluid is waste water which is purified in the bioreactor.

9. The method according to claim 1, wherein, during the periodic flushing, the fluid which is inside the membrane filtration module flows freely away in one go via the connection chamber towards the open flushing discharge line while taking along soiling components inside the membrane filtration module both along the membrane surface and in the connection chamber, and wherein, as soon as the flushing has finished the flushing discharge line is closed again, and the fluid mixture feed-through line is reopened.

10. The method according to claim 1, wherein, during the periodic flushing, the fluid which is inside the membrane filtration module then flows freely away in a downwards direction in one go to the open flushing discharge line via the connection chamber, and a fluid mixture level inside the membrane filtration module will fall to the level of the connection chamber, and wherein as soon as the flushing has finished, the flushing discharge line is closed, and the fluid mixture feed-through line is opened.

11. A method for cleaning membranes and an inlet side of a membrane filtration module, the method comprising:
filling at least a portion of a bioreactor with a treatment fluid, the treatment fluid including an active sludge;
feeding an incoming fluid comprising waste water to the treatment fluid in the bioreactor, the incoming fluid being mixed and treated with the treatment fluid so as to obtain a fluid mixture;
feeding the fluid mixture from the bioreactor to a dry-pit membrane filtration module through a fluid mixture feed-through line, the dry-pit membrane filtration module comprising a housing with one or more incorporated membranes, an inlet side, a permeate side connected to a permeate discharge line, and a retentate side connected to a retentate discharge line, the housing defining a connection chamber on the inlet side, upstream of the one or more incorporated membranes, wherein the connection chamber includes a closable flushing discharge line that discharges to the atmosphere;
discharging permeate filtered by and retentate retained by the one or more incorporated membranes; and
periodically, using a control unit, closing a first valve positioned in the fluid mixture feed-through line and a second valve positioned in the permeate discharge line to build an internal pressure in the connection chamber and the one or more incorporated membranes, and opening a third valve positioned in the flushing discharge line so that at least the inlet side of the one or more incorporated membranes and the connection chamber disposed underneath are flushed as a result of the release of the internal pressure and gravitational discharge, and wherein the fluid mixture discharges through the flushing discharge line in the absence of a pump in the flushing discharge line.

12. The method of claim 11, further comprising discharging the fluid mixture into a settling container through the flushing discharge line.

13. The method of claim 12, further comprising, periodically, recycling at least a portion of the fluid mixture from the settling container back to the bioreactor using the first sediment discharge line.

14. The method of claim 13, further comprising passing the fluid mixture through a filter positioned in the first sediment discharge line.

15. The method of claim 11, further comprising recycling the retentate discharging from the membrane filtration module back to the bioreactor through the retentate discharge line.

16. The method of claim 11, wherein a gas is delivered to a gas distributor which discharges into the connection chamber of the membrane filtration module during the periodic closing of the fluid mixture feed-through line and opening of the flushing discharge line.

17. The method of claim 11, wherein the periodic closing of the fluid mixture feed-through line and opening of the flushing discharge line is initiated by a counter, a time period, a local pressure and/or a calculated transmembrane pressure differential.

18. The method according to claim 11, wherein, during the periodic flushing, the fluid which is inside the membrane filtration module flows freely away in one go via the connection chamber towards the open flushing discharge line while taking along soiling components inside the membrane filtration module both along the membrane surface and in the connection chamber, and wherein, as soon as the flushing has finished the flushing discharge line is closed again, and the fluid mixture feed-through line is reopened.

19. The method according to claim 11, wherein, during the periodic flushing, the fluid which is inside the membrane filtration module then flows freely away in a downwards direction in one go to the open flushing discharge line via the connection chamber, and a fluid mixture level inside the membrane filtration module will fall to the level of the connection chamber, and wherein as soon as the flushing has finished, the flushing discharge line is closed, and the fluid mixture feed-through line is opened.

* * * * *